Figure 1:
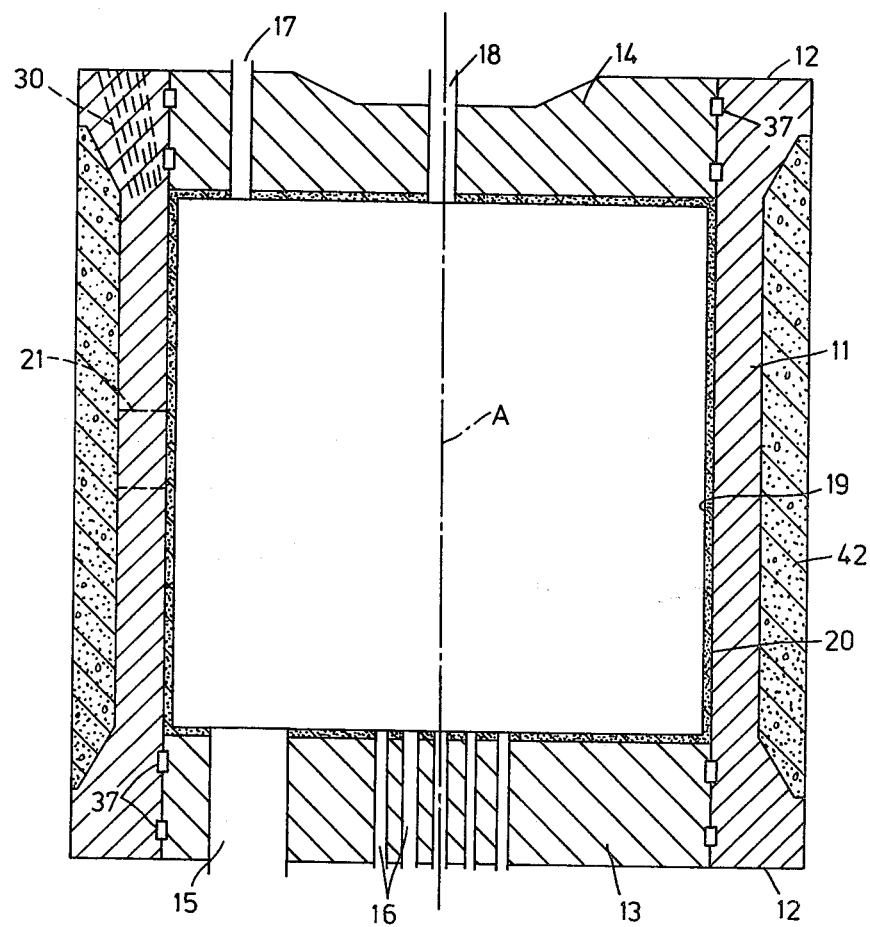

United States Patent [19]
Yellowlees

[11] Patent Number: 4,463,872
[45] Date of Patent: Aug. 7, 1984

[54] PRESSURE VESSELS

[75] Inventor: John M. Yellowlees, Cheshire, England

[73] Assignee: National Nuclear Corporation Limited, England

[21] Appl. No.: 347,642

[22] Filed: Feb. 10, 1982

[30] Foreign Application Priority Data

Feb. 13, 1981 [GB] United Kingdom ............... 8104632

[51] Int. Cl.³ .................. B65D 90/08; E04C 1/08; E04C 1/16; G21C 13/02
[52] U.S. Cl. .................. 220/428; 52/223 R; 52/224; 52/227; 52/245; 52/246; 52/249; 52/503; 52/505; 52/606; 220/1 B; 220/3; 220/5 A; 220/71; 220/426; 376/294
[58] Field of Search ............ 220/3, 1 B, 71, 468, 220/426, 428; 52/223 R, 224, 227, 245, 246, 249, 505, 606, 607, 605, 608, 503, 576, 595; 376/296, 295, 294

[56] References Cited

U.S. PATENT DOCUMENTS

| 2,414,011 | 1/1947 | Billner | 52/224 |
| 3,209,510 | 10/1965 | Nakanishi | 52/223 R |
| 3,433,382 | 3/1969 | Boggio | 138/153 |
| 3,568,385 | 3/1971 | Cruset et al. | 52/245 X |
| 3,712,012 | 1/1973 | Meyer et al. | 52/249 |
| 3,893,508 | 7/1975 | Nemet | 376/296 X |
| 4,111,327 | 9/1978 | Janakiev | 52/249 |
| 4,192,718 | 3/1980 | Janakiev | 376/294 X |

FOREIGN PATENT DOCUMENTS

| 547686 | 12/1922 | France | 52/245 |
| 295609 | 4/1932 | Italy | 52/245 |
| 81991 | 6/1953 | Norway | 52/505 |
| 24256 | of 1895 | United Kingdom | 52/249 |
| 296834 | 9/1928 | United Kingdom | 52/505 |

OTHER PUBLICATIONS

Paper H1/11, the 4th International Conference on Structural Mechanics in Reactor Technology, (Aug., 1977).

Primary Examiner—Allan N. Shoap
Attorney, Agent, or Firm—Kirschstein, Kirschstein, Ottinger & Israel

[57] ABSTRACT

To enable the benefits to be obtained simultaneously of using cast iron as a major constituent and of using helical prestressing, the cylindrical wall structure of a pressure vessel (which may be for a nuclear reactor) is made of truncated wedge shaped cast-iron slabs (the wedge faces of the slabs lying in radial planes of the wall structure and mutually adjacent slabs abutting one another in those planes, with a plurality of such slabs forming an annular assembly and a plurality of such assemblies stacked coaxially to form the cylindrical wall structure), the slabs having cast-in through passages, disposed obliquely, both right and left-handed in alternate layers at progressively increasing radial distance with respect to the cylindrical wall structrue, and the passages of one slab in alignment with the ends of passages of adjacent slabs in the same annular assembly and in the annular assemblies stacked adjacent thereto to provide in the assembled cylindrical wall structure a system of right- and left-handed generally helical tendon ducts therefor.

14 Claims, 11 Drawing Figures

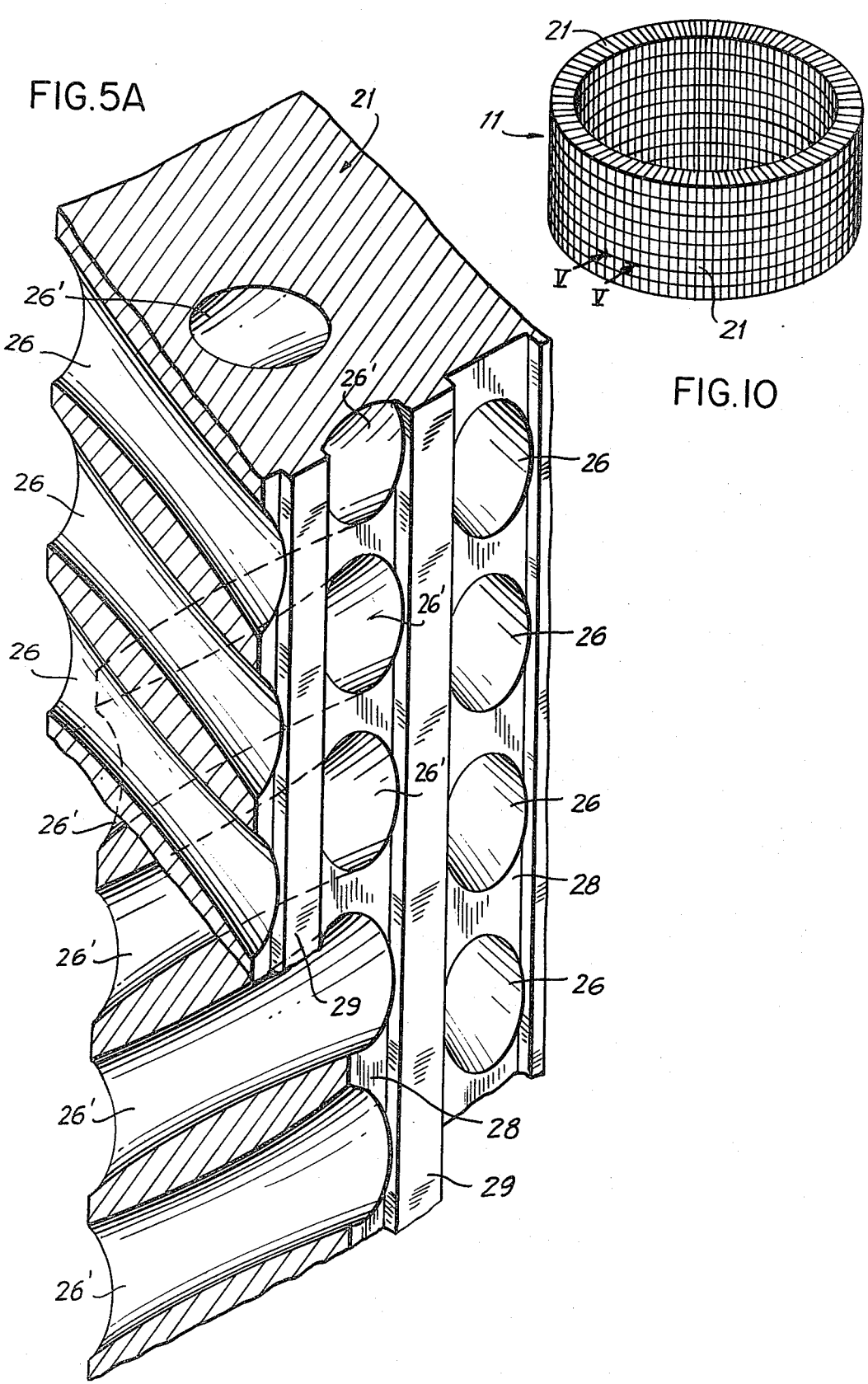

PRESSURE VESSELS

This invention relates to pressure vessels and in particular, though not exclusively, to nuclear-reactor pressure vessels.

It is well known to provide for a nuclear reactor a prestressed concrete pressure vessel having a monolithic vertical cylindrical wall and top and bottom slabs, in which the prestressing for the cylindrical wall may be achieved either by vertically disposed tendons within the thickness of the wall in combination with windings wrapped under tension externally round the wall with each turn substantially horizontal, or by helically disposed tendons within the thickness of the wall. The use of prestressed concrete results in a massively large structure when designed for elevated working pressures (in the region of 90 bar, for example).

Cast iron may be used at a peak stress many times the maximum allowable for concrete, and if advantage could be taken of this fact in practice it could lead directly to a much smaller pressure vessel structure and indirectly to substantial consequential advantages such as cost savings in surrounding structures, including a secondary containment vessel and refuelling plant. There has, indeed, been a proposal to build the cylindrical wall and top and bottom slabs of a nuclear reactor pressure vessel from cast iron components. In that proposal the component slabs were to be formed with two sets of apertures extending in axial direction of the assembled cylindrical wall: a first set intended to receive locating pins for positioning the slabs correctly relative to one another during assembly to form the cylindrical wall, and a second set intended to accommodate vertical tendons by which axial prestress for the wall is provided after assembly. Circumferential prestress, according to that proposal, was to be provided by external wire winding. That proposal, with its locating pins and apertures therefor, would not have been suited to modification to incorporate helical prestressing.

It is an object of the present invention to make use of the desirable properties of cast iron as a major constituent in the construction of a large pressure vessel and to do so in a way which allows the use of helical prestressing so that the advantages of this form of prestressing and of the use of cast iron can both be obtained.

According to the invention, broadly stated, this object is achieved by making the cylindrical wall structure of a pressure vessel of truncated wedge shaped cast-iron slabs (the wedge faces of the slabs lying in radial planes of the wall structure and mutually adjacent slabs abutting one another in those planes, with a plurality of such slabs forming an annular assembly and a plurality of such assemblies stacked coaxially to form the cylindrical wall structure), the slabs having cast-in through passages, disposed substantially helically, both right and left-handed, with respect to the cylindrical wall structure, and the passages of one slab having their open ends substantially in register with and in alignment with the ends of passages of adjacent slabs to provide in the assembled cylindrical wall structure a system of right- and left-handed generally helical tendon ducts therefor.

According to one aspect of the invention, there is provided a pressure-vessel wall component of cast iron, in the form of a truncated wedge-shaped slab having an inner end, an outer end and two mutually opposed wedge faces each extending between the inner end and the outer end and the wedge faces being similarly disposed with respect to respective planes inclined at an angle to one another and intersecting in a line, wherein the slab is formed with cast-in through-passages which are disposed substantially helically, both right and left-handed, with respect to the said line.

In such a pressure-vessel wall component, preferably, the through-passages are arranged in layers or courses at progressively spaced distances from the said line and are alternately right-handedly and left-handedly helical in alternate layers; and also, preferably, each of the said opposed wedge faces is formed with grooves extending parallel to the said line and, between the grooves, with lands for abutment against similar lands of another and similar wall component. The said outer end of such wall component is, preferably, formed with a recess and a peripheral flange surrounding said recess, and the peripheral flange is penetrated by apertures enabling it to be bolted to similar apertured flanges of other similar wall components.

The invention further provides a pressure-vessel wall structure of generally cylindrical form, composed of wall components as referred to in the last two preceding paragraphs, wherein a plurality of such components are assembled together with their said wedge faces in abutment to form an annular assembly and a plurality of such assemblies are stacked coaxially with one another to form the said wall structure, and wherein the through-passages of each wall component are in register with and in alignment with the through-passages of adjacent wall components, whereby the through-passages of the wall components provide in the assembled structure a system of right-handed and left-handed generally helical stressing tendon ducts therefor. Such a wall structure, when complete, is provided with tensioned stressing tendons extending helically through the said tendon ducts and secured at the ends thereof.

Such a wall structure according to the invention may be provided with end closure slabs secured at its respective ends as closures therefor and with a fluid-impermeable liner, enclosed within the said wall structure and end slabs and supported thereby against outward movement when subjected to internal pressure, to provide a pressure vessel according to the invention.

Figure 2:
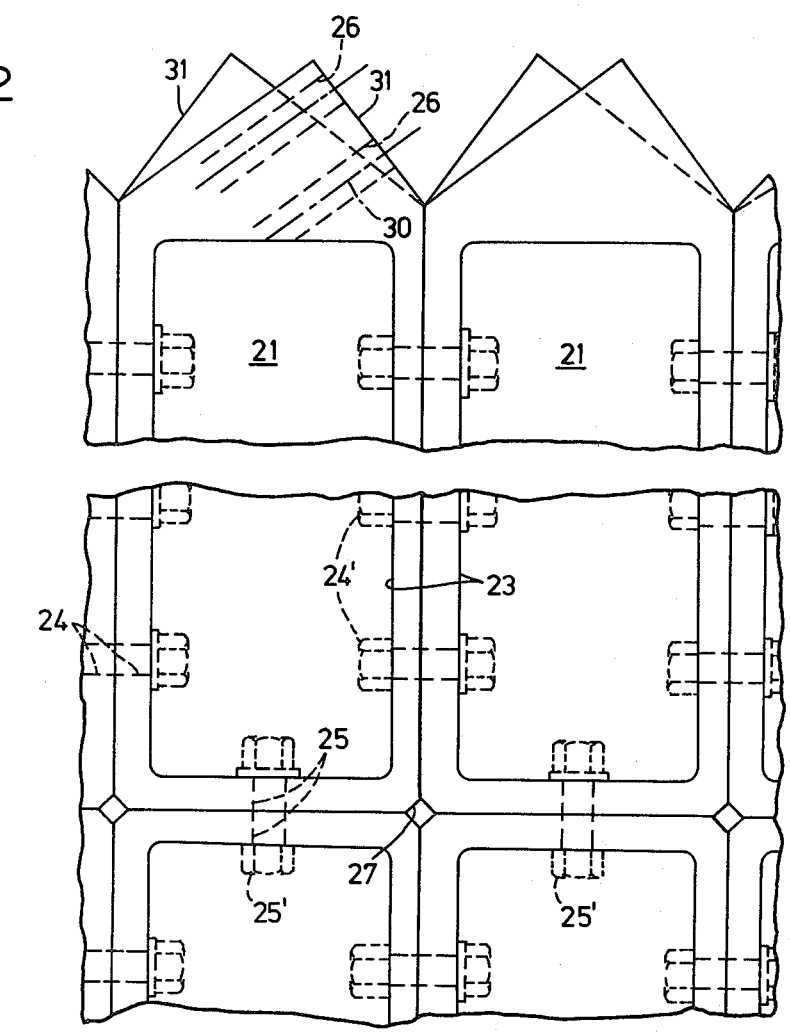
Figure 5:
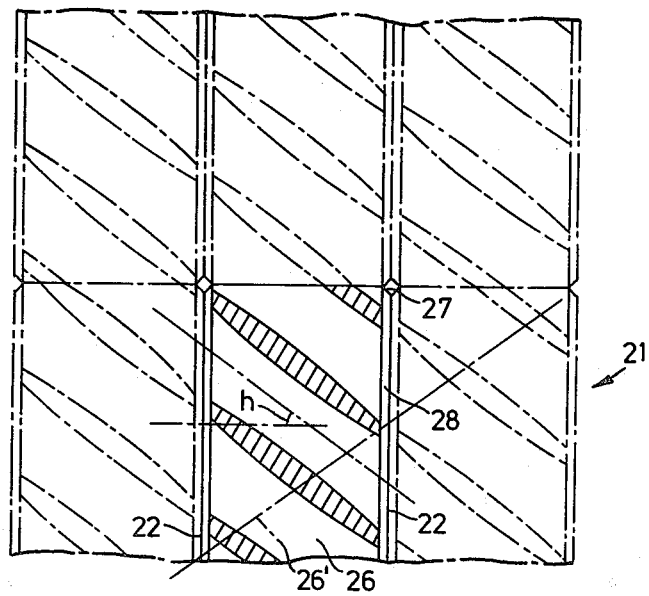
Figure 4:
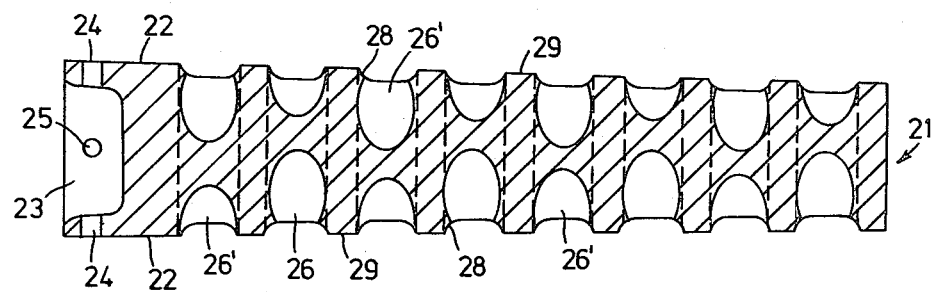
Figure 3:
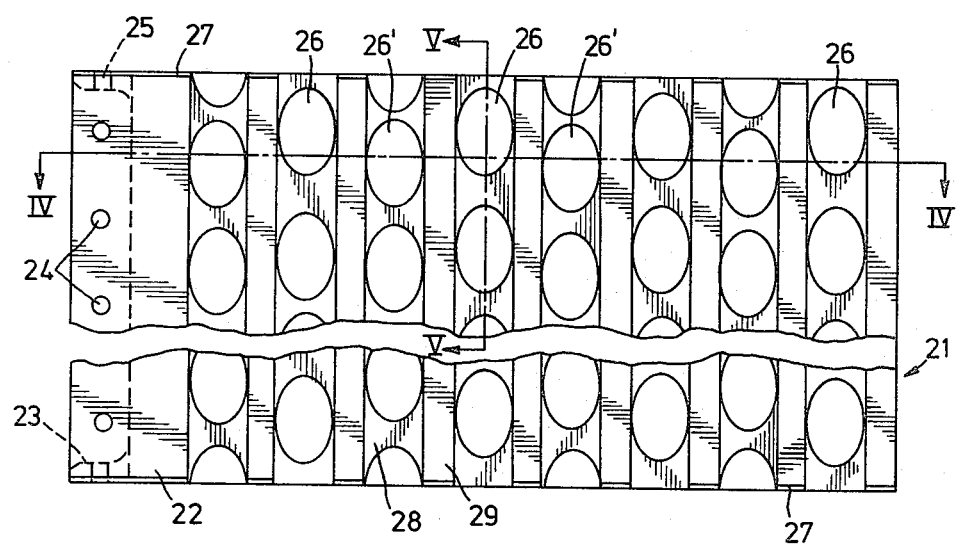

The nature of the invention, and further features of preferred embodiments of a pressure-vessel wall component according to the invention, and of a pressure-vessel wall structure incorporating such components and of pressure vessels incorporating such wall structures, will be more clearly described and explained in the following description of such components, wall structures and pressure vessels with reference to the accompanying drawings, in which:

FIG. 1 is a diagrammatic vertical axial sectional view of a nuclear-reactor pressure vessel in accordance with the invention, FIG. 2 is a fragmentary external view of parts of a cylindrical wall structure of the pressure vessel shown in FIG. 1, FIG. 3 is an elevational view of a component slab of the pressure vessel cylindrical wall structure shown in FIGS. 1 and 2, FIG. 4 is a horizontal sectional view of the slab shown in FIG. 3, taken substantially along the line IV—IV thereof;

FIG. 5 is a developed circular sectional view of the nuclear-reactor pressure vessel, taken substantially along the line V—V of FIG. 10; and FIG. 5A is a perspective fragmentary view of the slab shown in FIG. 3.

Figure 7:
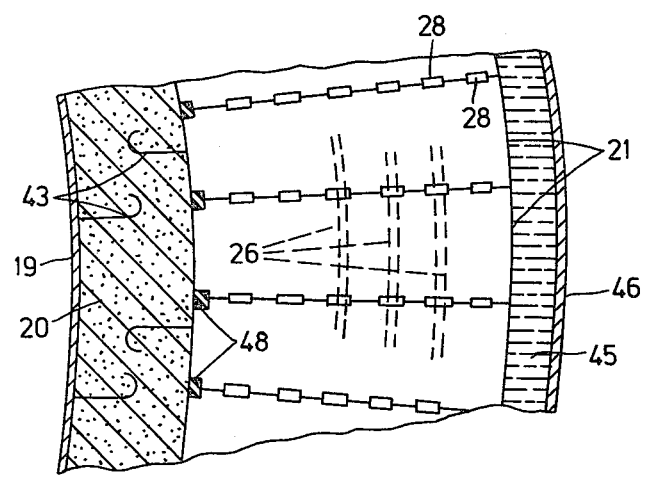
Figure 6:
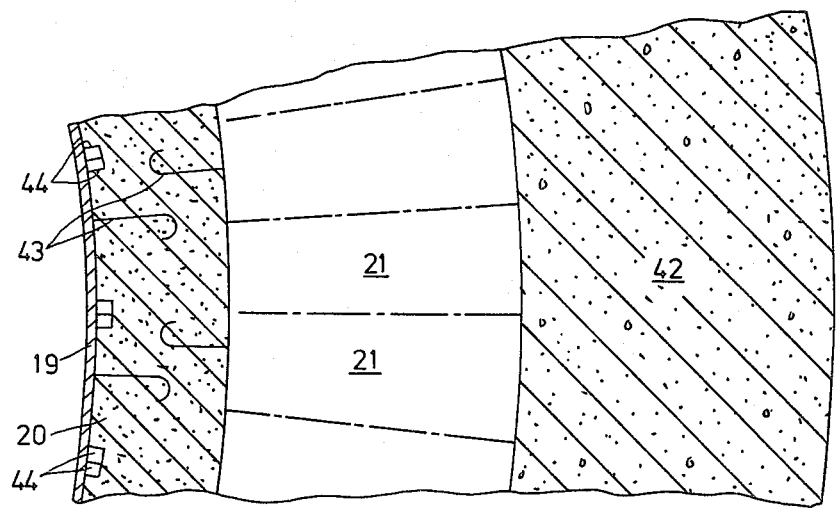
Figure 8:
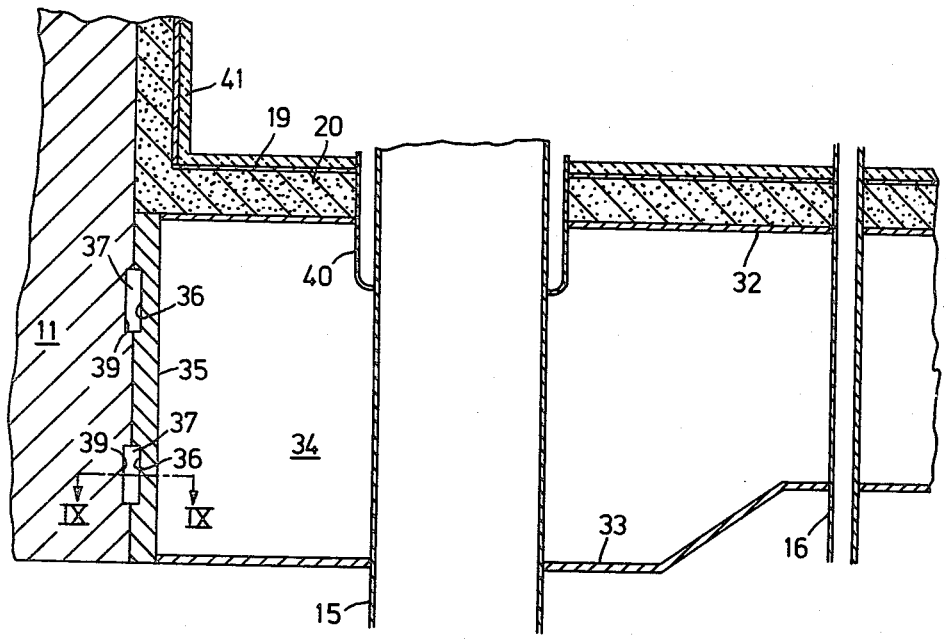
Figure 9:
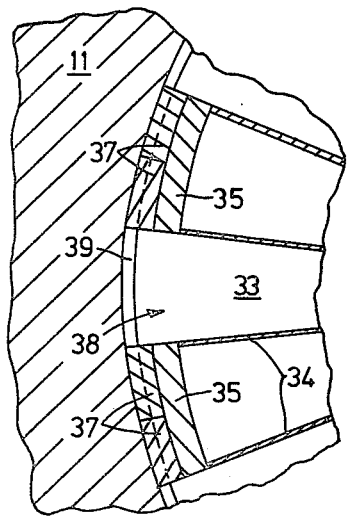

FIG. 6 is a diagrammatic fragmentary horizontal sectional view of part of the cylindrical wall of the pressure vessel shown in FIG. 1, including a water-cooled lining provided within the wall and concrete shielding provided outside it, FIG. 7 is a corresponding diagrammatic horizontal sectional view of a similar pressure vessel wall provided with a different form of water cooling, in another embodiment of the invention, FIG. 8 shows diagrammatically the junction of the cylindrical wall structure and an end closure slab of the vessel shown in FIG. 1, FIG. 9 is a scrap sectional view taken on the line IX—IX of FIG. 8, and illustrates a detail thereof, and FIG. 10 is a thumbnail perspective schematic view of the nuclear-reactor pressure vessel embodying the present invention.

The nuclear-reactor pressure vessel 10 shown in FIG. 1 comprises a cylindrical wall structure 11 with a vertical central axis A and with radially thickened upper and lower ends 12, closed by lower and upper end closure slabs 13 and 14, respectively, which are formed with various required penetrations such as coolant circulator penetrations 15, control rod penetrations 16, feedwater and steam penetrations 17 leading to and from steam generators (not shown) disposed within the pressure vessel, and one or more refuelling penetrations 18 for permitting refuelling and other operations on a nuclear reactor core (likewise not shown, but also disposed within the pressure vessel 10). Within the vessel 10 is an impermeable liner 19 (of steel, for example) apertured to receive, and sealingly united with, the inner ends of tubular liners of the various penetrations as will be described below. The liner 19 is slightly spaced from the inner surfaces of the cylindrical wall structure 11 and of the end slabs 13 and 14, and the space is filled with a suitable supporting grout 20.

In accordance with the invention, and as shown in FIGS. 2 to 7, the cylindrical wall structure 11 is assembled from components in the form of truncated wedge-shaped cast-iron slabs 21, the position of only a single one of which is indicated, in FIG. 1, by broken lines representing the position of its top and bottom faces. Referring to FIGS. 3 to 5, the typical slab 21 there shown has two opposed and mutually inclined plane faces 22 which, in the assembled cylindrical wall structure 11, are disposed in radial planes with respect to the wall structure and are abutted by the corresponding faces of two adjacent slabs in an annular assembly of such slabs. The two radial planes, with respect to which the two wedge faces 22 are respectively similarly disposed, intersect one another in a line which is the central axis A of the pressure vessel. The radially outer end face of each slab 21 is recessed to form a surrounding peripheral flange 23, and in the flanges there are provided horizontally and vertically directed bores 24 and 25, respectively, which (as shown in broken line in FIG. 2) enable each slab to be bolted, during erection of the wall structure 11, by means of bolts 24' and 25' to its neighbours in the respective annular assembly and to a correspondingly positioned slab in each of the two annular assemblies next above and below in the stack of such assemblies which make up the cylindrical wall structure 11. The slab is further formed with cast-in through passages 26 which, as shown in FIG. 5, extend obliquely through the slab at an angle h to the horizontal and are flared outwardly towards their open ends. The slab has several layers or courses of the passages 26, at spaced radial distances, as shown in FIGS. 3 and 4, and in each slab the oblique inclinations of the passages are of opposite hand in alternate radially-spaced layers. Thus the passages 26 of the fifth layer of such passages, counting from the inner or right-hand end of the slab as seen in FIG. 4, are inclined obliquely upwardly to the left as viewed from the inner end of the slab, as is shown in FIG. 5; and the oblique inclination of the passages is the same in each of the other odd-numbered layers. In the alternate, even-numbered layers, the passages 26 are similarly shaped and spaced but are oppositely handed: that is, their oblique inclination is upwardly to the right as seen in FIG. 5, as is indicated by only a single inclined line 26' in that Figure in order to avoid confusing complexity of the Figure. When the slabs are assembled together, the passages 26 of each radially-spaced layer of each slab align with those in the corresponding layer in each of the adjacent slabs, as indicated in FIG. 5, to provide, in the cylindricradially-spaced cylindrical layers of helically disposed tendon ducts which are of opposite hand in alternate radially-spaced layers. The helical pitch angle h of the ducts may be constant for all the ducts over their entire length or, by suitable design of the individual slabs 21, may be varied in any manner deemed desirable, e.g. by decreasing the pitch angle h with increasing radius of the layer of passages, so as to maintain equality of the actual helical pitch distance, in the axial direction of the vessel, of the tendon ducts in all the radially-spaced layers.

In order to minimise any assembly difficulties due to manufacturing tolerances, the corners of the slabs 21 are formed with chamfers 27. Also, the wedge faces 22 of the slabs are formed with vertically-extending grooves 28 between which are defined lands 29, these latter being disposed between the layers of passages 26. Thus the grooves 28 are at the same radial positions as the layers of passages 26, and the passages open into the grooves. With the slabs 21 assembled, and held bolted together in their assembled relationship by the bolts 24' and 25' in the bores 24 and 25, the helical tendon ducts constituted by the aligned passages 26 are fitted with prestressing tendons 30 each of which extends helically from the top to the bottom of the wall 11 and which are then tensioned to provide the required prestressing of the wall 11. As indicated schematically in FIG. 1, the radial dimensions of the uppermost and lowermost slabs 26 may be increased so that the outer diameter of the wall 11 is correspondingly increased at its upper and lower ends, and the tendons 30 and the ducts therefor may then be correspondingly radially spread at their upper and lower ends as indicated in broken line. Also, the under surfaces of the lowermost slabs and, as shown schematically in FIG. 2, the upper surfaces of the uppermost slabs may be formed with alternatingly assymmetrical triangular projections, each corresponding to one layer of tendon ducts and providing a respective anchorage abutment surface 31 which is substantially perpendicular to one or more of the tendons 30 of the respective layer, where the corresponding passage or passages 26 emerge at that surface.

With the tendons 30 engaged at their upper and lower ends, and tensioned, in known manner by tensioning and anchoring means (not shown, but of known kind) mounted and supporare held in position relative to one another quite independently of the bolts 24' and 25' fitted in the holes 24 and 25 during erection. The lands 29 of mutually adjacent slabs bear against one another, but some of these lands may be machined so as not to make contact, thereby increasing the loading on the adjacent contacting lands. This enables a substantially uniform radial wall strain to be achieved if desired, since without use of this means of adjustment the wall strain would be significantly less in the vicinity of the end slabs 13 and 14. The outward flaring of the passages 26 towards their ends ensures that the prestressing tendons 30 do not encounter any sharp corners and are accordingly not subjected to angular discontinuities where they pass from one slab to another.

The end slabs 13 and 14 may be constructed in any suitable manner, not necessarily solid as indicated in FIG. 1, which is intended only as a schematic representation. For example, and as shown in FIG. 8, they may be fabricated from inner and outer steel plates 32 and 33 having steel webs 34 welded therebetween to form box structures, suitable apertures being provided to receive welded-in steel liners of the various penetrations such as the coolant-circulator penetration 15 shown in FIG. 8. Peripherally spaced anchoring webs 35 welded to the plates 32 and 33 and to the webs 34, and formed with peripherally extending keyways 36, enable the end slabs to be locked in position in the ends of the wall 11 by means of keys 37 which can be inserted into spaces 38 (see FIG. 9) between adjacent webs 35 and thence into the keyways 36 and opposed keyways 39 formed in the surface of the wall (the keys being first inserted in the keyways 39 at the spaces 38 and then jacked sideways, i.e. in the peripheral direction along those keyways so as to enter the keyways 36 and thereby lock the end slabs in position).

With the end slabs 13 and 14 thus located, the tendons 30 are preferably tensioned to produce about 90% of their designed prestress and the box structures of the end slabs 13 and 14 are then filled with a concrete in-fill. Also, the grout 20 between the liner 19 and the wall 11 and end slabs 13 and 14 is preferably introduced at this partially-prestressed stage, though it may be deferred until tensioning of the tendons 30 is complete. After completion of the grouting, the liner 19 is sealed to the liners of the various penetrations either directly or, as shown in FIG. 8, to a surrounding sleeve 40 which is itself welded to the penetration liner. In either case, of course, an aperture formed in the liner 19 to receive the penetration liner (and surrounding sleeve if provided) may be made oversize so as to ensure no interference during fitting and prestressing, and the welding operation may then involve the welding in of fillets measured to bridge the eventual clearance gap. With the welding completed, a layer 41 of insulating material such as steel foil and ceramic wool may be fitted to the inner surface of the liner 19, as shown in FIG. 8.

The concrete in-fill of the end slabs 13 and 14 serves several purposes: it stiffens the end slabs themselves against bowing and bending, it stabilises the penetration liners and buttresses them against any tendency to burst under internally applied pressure, and it provides radiological shielding. As shown in FIGS. 1 and 6, a concrete radiological shield 42 is also cast round the cylindrical wall 11 after completion of the prestressing. FIG. 6 also, besides ed notably: the provision on the outer surface of the liner 19 and on the opposed inner faces of the wall slabs 21 of projecting ties 43 which help to anchor both to the grouting 19 and thus to one another. Also welded to the outer surface of the liner 19 are cooling-water tubes 44 through which water is circulated during operation of the reactor contained within the vessel, so as to limit the temperature attained by the liner 19 and thus protect from overheating all the layers outside the liner.

FIG. 7 illustrates a different embodiment of the invention, in which a pressure vessel constructed substantially as already described is immersed in a pool of cooling water 45 contained within a surrounding tank 46. In this embodiment, the liner 19 is provided with no cooling-water tubes like the tubes 44 in FIG. 6, but the cooling water 45 penetrates the vertical passages constituted by opposed pairs of grooves 28 of the slabs 21 of the cylindrical wall 11, and also the passages 26 which open into the grooves 28. Thus the whole structure of the wall constituted by the slabs 21 is permeated by cooling water which circulates, or is circulated, through it to maintain suitably limited temperatures throughout the structure (including the liner 19 which is cooled by conduction through the grout 20). Preferably, rubber or other elastomeric seals 48 are provided between adjacent slabs 21 at their radially inner ends, to prevent water seepage into the grout 20. In this embodiment, the water within the tank 46 (including that permeating the slabs 21) constitutes an effective radiological shield, and no concrete shield corresponding to the shield 42 in FIG. 1 is required.

Although in the embodiments of the invention which are described above the cast slabs 21 are in every case disposed vertically, and this has the advantage of being particularly convenient for handling and positioning by means of a crane, it should be understood that that is not an essential feature of the invention. On the contrary, the slabs might, if desired, be made of greater dimension in the circumferential direction than vertically, in which case it might be desirable to provide relieving grooves like the grooves 28 not only on the vertical faces, disposed in radial planes, but also (or alternatively) on the horizontal faces (such grooves being curved in circular arcs about the vessel axis).

Again, both the above-described embodiments of pressure vessels according to the invention are intended for containing nuclear reactors, but pressure vessels made in accordance with the invention may also be applied to other purposes, such as high pressure storage of gases or liquids generally, including, for example, district-heating hot-water storage at high pressure and elevated temperature, possibly up to 250° C. Within or outside a nuclear-power context, vessels according to the invention may be employed in situations where they are not normally subjected to high internal pressure but must be capable of withstanding such pressures; for example, as burst protection surrounding the ordinary containment vessel of a boiling water reactor or a pressurised water reactor.

I claim:

1. A pressure-vessel wall component, in the form of a truncated wedge-shaped slab of cast iron having an inner end, an outer end, upper and lower faces and two mutually opposed wedge faces each extending between the inner end and the outer end and between upper and lowe faces in respective planes which are inclined at an angle to one another and intersect in a line, wherein the slab is formed with cast-in through-passages which are arranged in layers at progressively spaced distances from the said line, the through-passages in each layer extending, at a common distance from the said line and parallel with one another, obliquely in a direction from one of said planes to the other and from the lower to the upper face, the obliquity of direction being reversed in successive layers of said component whereby the through-passages extend obliquely left- and right-handedly with respect to said line in alternate layers of such passages at progressively spaced distances from said line.

2. A pressure-vessel wall component as claimed in claim 1, wherein each of the said opposed wedge faces is formed with grooves extending parallel to the said line and, between the grooves, with lands for abutment against similar lands of another and similar wall component.

3. A pressure-vessel wall component as claimed in claim 2, wherein the grooves in the said opposed faces are at the same spaced distances from the said line as are the layers of through-passages and the said lands are accordingly positioned at radial distances from the said line which are interspersed between the radial distances of the said layers.

4. A pressure-vessel wall component as claimed in claim 1 or 2 or 3, wherein the said outer end is formed with a recess and a peripheral flange surrounding said recess, and the peripheral flange is penetrated by apertures enabling it to be bolted to similar apertured flanges of other similar wall components.

5. A pressure-vessel wall structure of generally cylindrical form, composed of wall components as claimed in claim 1, wherein a plurality of such components are assembled together with their said wedge faces in abutment to form an annular assembly and a plurality of such assemblies are stacked coaxially with one another to form the said wall structure, and wherein the through-passages of each wall component are in register with and in alignment with the through-passages of adjacent wall components in the same assembly and in assemblies stacked adjacent thereto, whereby the through-passages of the wall components provide in the assembled structure a system of right-handed and left-handed generally helical stressing tendon ducts therefor.

6. A pressure-vessel wall structure as claimed in claim 5, having tensioned stressing tendons extending helically through the said tendon ducts and secured at the ends thereof.

7. A pressure vessel comprising a wall structure of generally cylindrical form as claimed in claim 5, end closure slabs secured at respective ends of the said wall structure as closures therefor, and a fluid-impermeable liner enclosed within the said wall structure and end slabs and supported thereby against outward movement when subjected to internal pressure.

8. A pressure vessel as claimed in claim 7, wherein the liner is spaced inwardly from the cylindrical wall structure and the end slabs, and the intervening space is packed with a grout material.

9. A pressure vessel as claimed in claim 7, and disposed within an outer container, wherein a liquid is provided within the outer container and penetrates into the tendon ducts of the cylindrical wall structure of the pressure vessel.

10. A pressure-vessel wall structure of generally cylindrical form, composed of wall components as claimed in claim 1, wherein a plurality of such components are assembled together with their said wedge faces in abutment to form an annular assembly and a plurality of such assemblies are stacked coaxially with one another to form the said wall structure, and wherein the through-passages of each wall component are in register with and in alignment with the through-passages of adjacent wall components, whereby the through-passages of the wall components provide in the assembled structure a system of right-handed and left-handed generally helical stressing tendon ducts therefor, and wherein the said outer end of each said wall component is formed with a recess and an apertured peripheral flange surrounding such recess and mutually adjacent said wall components are bolted together by means of their said peripheral flanges.

11. A pressure-vessel wall structure as claimed in claim 10, having tensioned stressing tendons extending helically through the said tendon ducts and secured at the ends thereof.

12. A pressure vessel comprising a wall structure of generally cylindrical form as claimed in claim 11, end closure slabs secured at respective ends of the said wall structure as closures therefor, and a fluid-impermeable liner enclosed within the said wall structure and end slabs and supported thereby against outward movement when subjected to internal pressure.

13. A pressure vessel as claimed in claim 12, wherein the liner is spaced inwardly from the cylindrical wall structure and the end slabs, and the intervening space is packed with a grout material.

14. A pressure vessel as claimed in claim 13 and disposed within an outer container, wherein a liquid is provided within the outer container and penetrates into the tendon ducts of the cylindrical wall structure of the pressure vessel.

* * * * *